(12) United States Patent
Tsengas et al.

(10) Patent No.: US 8,025,550 B2
(45) Date of Patent: Sep. 27, 2011

(54) NOCTURNAL PET TOYS

(75) Inventors: Steven Tsengas, Fairport Harbor, OH (US); Justine A. Conklin, Fairport Harbor, OH (US); David S. Deily, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 0 days.

(21) Appl. No.: 12/781,862

(22) Filed: May 18, 2010

(65) Prior Publication Data

US 2010/0294211 A1    Nov. 25, 2010

Related U.S. Application Data

(63) Continuation-in-part of application No. 11/601,939, filed on Nov. 20, 2006, now abandoned.

(51) Int. Cl.
*A63H 5/00* (2006.01)
*A01K 29/00* (2006.01)

(52) U.S. Cl. ........ 446/270; 446/219; 446/297; 446/373; 446/409; 446/486; 119/707

(58) Field of Classification Search .................. 446/219, 446/297, 409, 270, 373, 486; 119/707
See application file for complete search history.

(56) References Cited

U.S. PATENT DOCUMENTS

| 2,504,650 | A | * | 4/1950 | Chessrown | 434/172 |
|---|---|---|---|---|---|
| 3,633,587 | A | * | 1/1972 | Hunt | 606/235 |
| 5,078,643 | A | | 1/1992 | Thill | |
| 5,186,458 | A | * | 2/1993 | Redondo | 473/570 |
| 5,575,240 | A | * | 11/1996 | Udelle et al. | 119/707 |
| 5,791,965 | A | | 8/1998 | Kim | |
| 5,816,883 | A | | 10/1998 | Holland | |
| 6,039,628 | A | * | 3/2000 | Kusmiss et al. | 446/457 |
| 6,142,846 | A | | 11/2000 | Ojakaar | |
| 6,186,095 | B1 | * | 2/2001 | Simon | 119/707 |
| 6,371,053 | B1 | * | 4/2002 | Tsengas | 119/707 |
| 6,508,732 | B1 | * | 1/2003 | Romberger et al. | 473/606 |
| 6,550,426 | B2 | * | 4/2003 | Tsengas | 119/707 |
| 6,578,527 | B1 | * | 6/2003 | Mathers | 119/707 |
| 6,651,590 | B2 | * | 11/2003 | Willinger et al. | 119/707 |
| 7,104,222 | B2 | * | 9/2006 | Tsengas | 119/711 |
| 2005/0005873 | A1 | * | 1/2005 | Gick | 119/707 |
| 2006/0249096 | A1 | * | 11/2006 | Gick | 119/707 |

* cited by examiner

*Primary Examiner* — Gene Kim
*Assistant Examiner* — Scott Young

(57) ABSTRACT

A simulated mouse toy having a prerecorded sound chip therein is provided which emits a prerecorded sound upon physical movement, such as when swatted, rolled or carried, to encourage pets to continue to play. An illumination device, such as luminescent or chemiluminescent coatings or light emitting diodes (LED's) are operatively connected in conjunction the prerecorded sound chip to simultaneously provide a blinking visual stimulation.

10 Claims, 6 Drawing Sheets

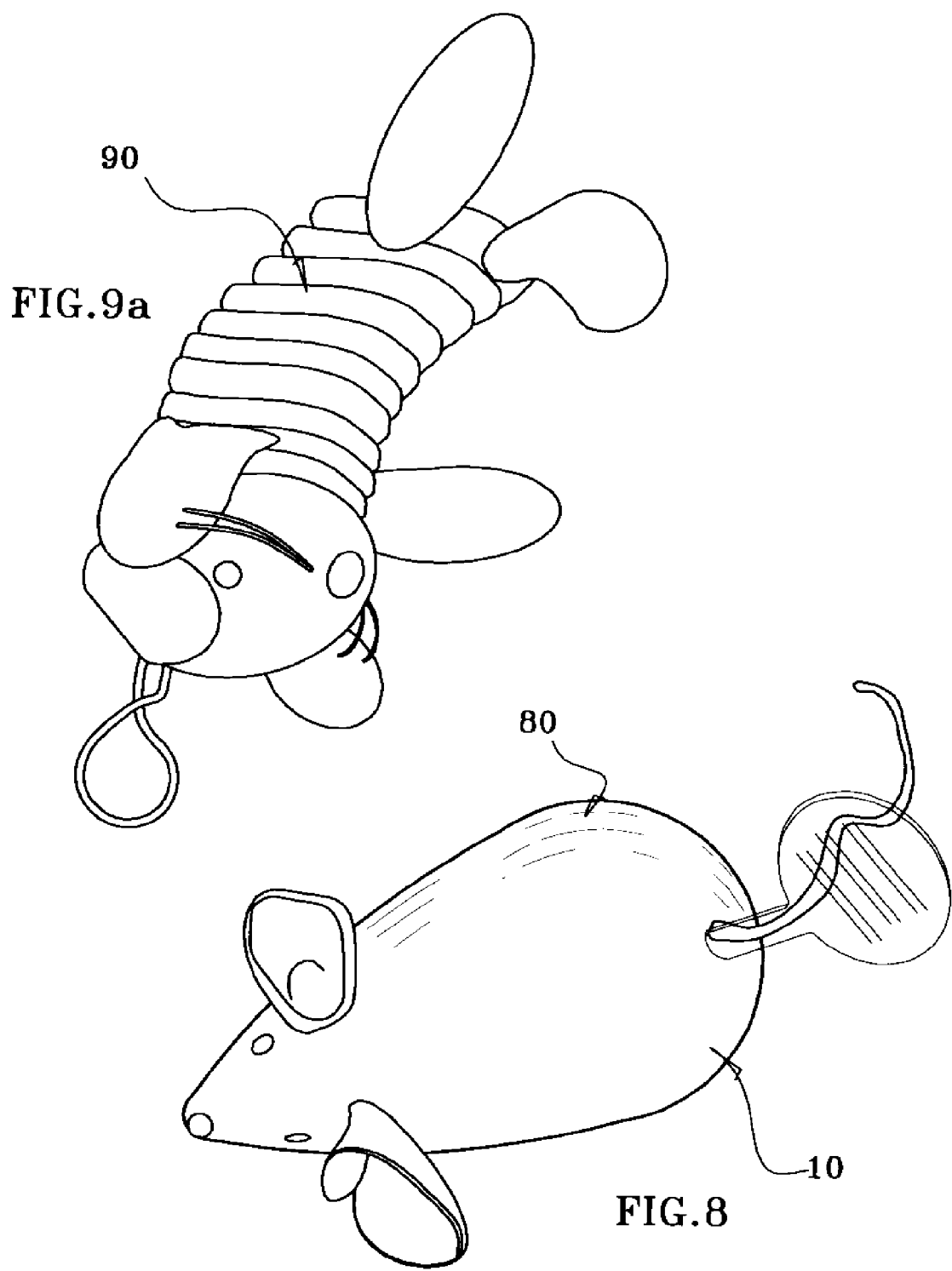

NOCTURNAL PET TOYS

RELATED APPLICATIONS

The present application is a Continuation in Part of U.S. Utility application Ser. No. 11/601,939, which was filed on Nov. 20, 2006 now abandoned and is incorporated by reference as if fully rewritten herein.

BACKGROUND OF THE INVENTION

1. Field of the Invention

The present invention relates generally to a pet toy having a prerecorded sound chip and, more particularly, to such a device adapted for nocturnal sensory simulation by actuating the sound chip and an illumination element in combination upon imparting motion to the toy.

2. Description of the Related Art

Some pets, such as, for example, cats, are naturally nocturnal and can spend a significant amount of their active time at night and alone when their owners are sleeping or not present. While having healthy and happy pets is an objective of virtually every pet owner, the ability of pet owners to provide interactive exercise and play toys for their pets is usually limited at night due to the limitation that sensory stimulation can have in the dark.

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment. However, pets tend to having limited interest in such devices in the dark due to lack of visual stimulation and thus, the pets do not benefit from exercise and enjoyment from such devices when they are not used by the pets.

A search of the prior art did not disclose any patents that read directly on the claims of the instant invention; however, of considerable relevance is U.S. Pat. No. 6,371,053, issued on Apr. 16, 2002 to the present inventor. While a sound simulated mouse toy having a prerecorded sound chip therein is incorporated into this invention in combination, other elements are different enough as to make the combination distinguished over the inventors' own prior art.

Consequently, a need has been felt for providing an apparatus and method of providing both visual and sound stimulation to attract the interest of nocturnal pets.

SUMMARY OF THE INVENTION

It is an object of the present invention to provide an improved sensory simulating toy for pets.

It is a feature of the present invention to provide such a pet toy having both a prerecorded sound chip and an illumination mechanism that are both actuated by imparting motion to the toy.

Briefly described according to one embodiment of the present invention, a simulated mouse toy having a prerecorded sound chip therein is provided in accordance with the present invention emits a prerecorded sound upon physical movement, such as when swatted, rolled or carried, to encourage pets to continue to play. An illumination device, such as light emitting diodes (LED's) are operatively connected in conjunction the prerecorded sound chip to simultaneously provide a blinking visual stimulation.

An advantage of the present invention is that it encourages pets with the benefit from exercise and enjoyment from playing with the toy at night or in the dark or low light conditions.

Another advantage of the present invention is that it provides auditory and visual stimulation simultaneously.

These and other objects of the present invention are attained by various embodiments incorporating the teachings of the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 8 is photograph of a simulated mouse toy having a multi sensory stimulation device targeted toward a pet's nocturnal instincts and behaviors in accordance with a fourth preferred embodiment of the present invention; and FIG. 9 is photograph of a simulated mouse toy having a multi sensory stimulation device targeted toward a pet's nocturnal instincts and behaviors in accordance with a fifth preferred embodiment of the present invention.

DESCRIPTION OF THE PREFERRED EMBODIMENTS

Figure 1:
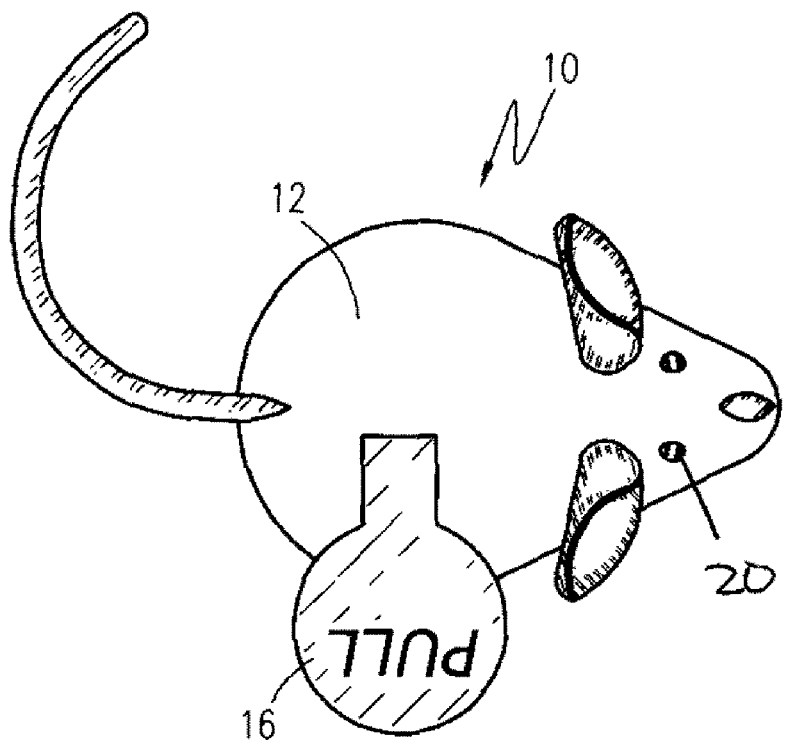
FIG. 1 is top view of a simulated mouse toy having a multi sensory stimulation device targeted toward a pet's nocturnal instincts and behaviors in accordance with a first preferred embodiment of the present invention.
Figure 2:
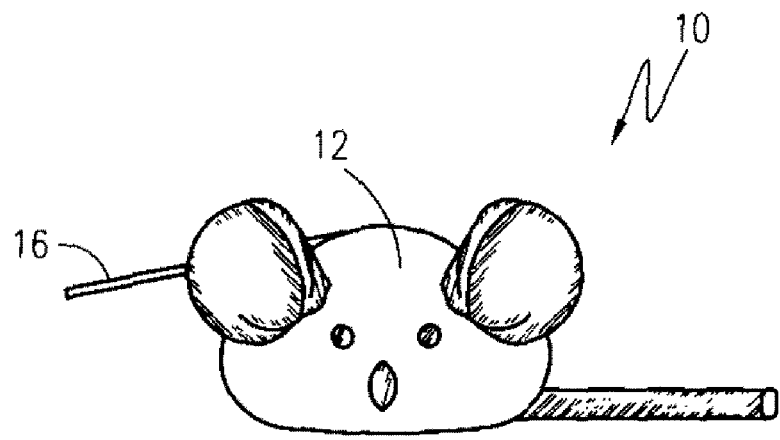
FIG. 2 is a front view of the first preferred embodiment of the present invention shown in FIG. 1.
Figure 4:
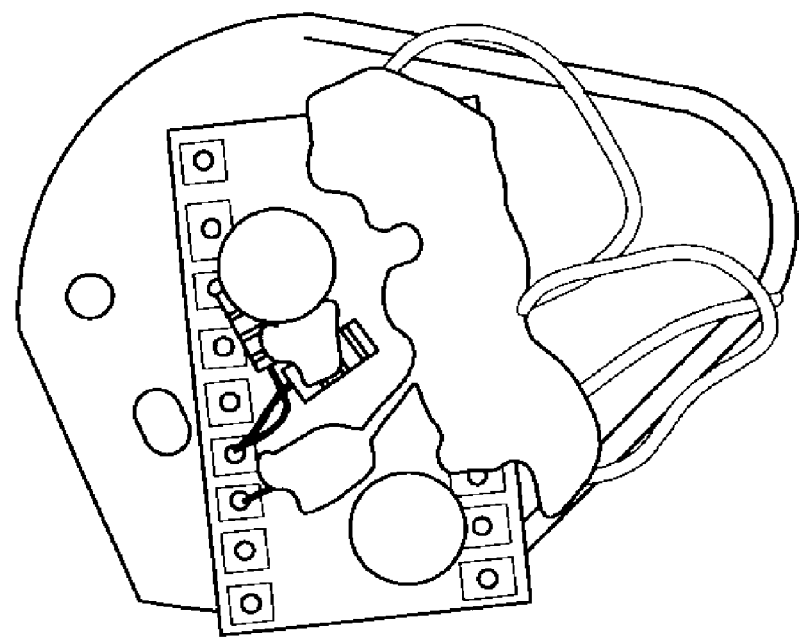
FIG. 4 is a top plan view of the multi sensory stimulation device is housed within the assembly of FIG. 1-3.
Figure 3:
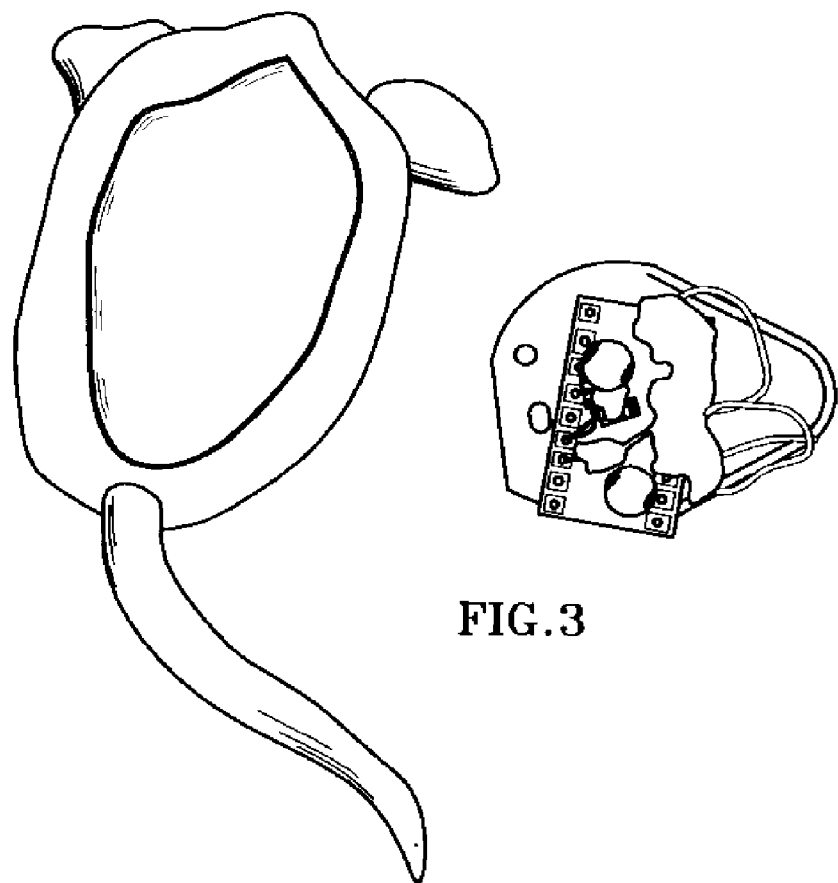
FIG. 3 is an exploded top view of the present invention shown in FIG. 1 with the sound chip assembly removed from the simulated mouse toy.

The best mode for carrying out the invention is presented in terms of its preferred embodiment, herein depicted within the FIGS. 1-5.

1. Detailed Description of the Figures

A simulated mouse toy having a prerecorded sound chip in combination with an illumination mechanism is depicted in FIG. 1 through 4 which illustrate a top view, a front view, and an exploded top view, respectively, of a simulated mouse toy having a multi sensory stimulation device targeted toward a pet's nocturnal instincts and behaviors in accordance with the a first preferred embodiment of the present invention, identified generally by reference number 10. Simulated mouse toy 10 generally includes outer cover 12 having an internal cavity and sound chip assembly 14 is positioned in the interior cavity of outer cover 12. Outer cover 12 is most preferably fabricated from a relatively soft, yet durable, textile material with filling or stuffing and has the outward appearance of a mouse or other prey. Sound chip assembly 14 includes a shaker barrel activator, a prerecorded sound chip and a source of electrical power, such as a battery. If desired, catnip can be placed in the interior cavity of outer cover 12 and the catnip, along with the outward appearance of outer cover 12, will attract pets, such as, for example, cats.

A multi sensory stimulation device is housed within the assembly 14 preferably emits a prerecorded sound in response to movement of multi sensory stimulation device 14. An illumination mechanism 20, typified by a one or more light emitting diodes (LED's), is operatively connected in conjunction the prerecorded sound chip to simultaneously provide a blinking visual stimulation. As shown herein, the LED's are positioned such as to correspond with the eyes of the prey, and are provided having a wavelength requiring minimal power such as to extend the operation of the batteries. Once such LED wavelength of 568 nm has been found to be satisfactory; however, it would be obvious to one skilled in the art, in light of the present teachings, that such a design choice is not a limitation and could have a number of equivalents. Further, in such a position, the lens case of the LED is aligned penetrating the outer cover and a plastic or similar semi-rigid washer is adhered to the base of the LED, thereby forming a sandwich structure about the fabric cover. Such an attached washer aids in preventing the physical interaction of the animal from detaching the cathode or anode connections of the LED or otherwise minimizing the risk of destruction of the assembly 14 by the pet. It should be noted that such a design preference is not intended as a limitation, and it is envisioned that the illumination elements can be positioned anywhere on the prey, or in the prey such as to illuminate through the body at any position. Thus, when a pet, such as a cat, swats simulated prey toy 10, a prerecorded sound is activated. This prerecorded sound can be a "permanent" prerecorded sound such as an animal's voice, such as "meow" or "purrrrrr," a beeping sound, a human voice, laughter, such as "ha, ha, ha" or some other desired sound, or can be recorded, and prerecorded, as desired, by the user. The prerecorded sound continues for a predetermined time period, for example five (5) seconds, and then stops until simulated mouse toy 10 is again moved. Pull tab 16 is preferably inserted into multi sensory stimulation device 14 to preclude sound multi sensory stimulation device 14 from emitting sound prior to pull tab 16 being removed from multi sensory stimulation device 14.

Figure 5:
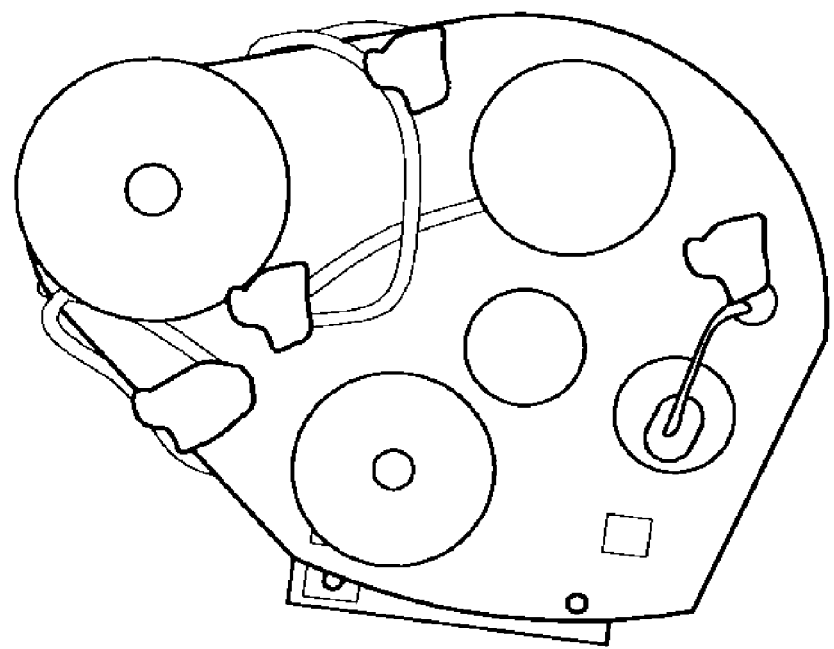
FIG. 5 is a typical electrical schematic for exemplary operation of the multi sensory stimulation device for use herein.

Referring next, to FIG. 5, a typical electrical schematic for exemplary operation of the multi sensory stimulation device is shown for purposes of disclosing a best mode as currently known. It would be obvious to a person having ordinary skill in the relevant art that many modifications or alternates to the typical electrical schematic would be operationally equivalent within the teachings, features and benefits of the current invention.

Similarly, it is anticipated that alternate mechanisms can be provided to allow for an apparatus and method of providing both visual and sound stimulation to attract the interest of nocturnal pet. By way of example, and not as a limitation, FIG. 6-9 depict some such alternate embodiments.

Figure 6:
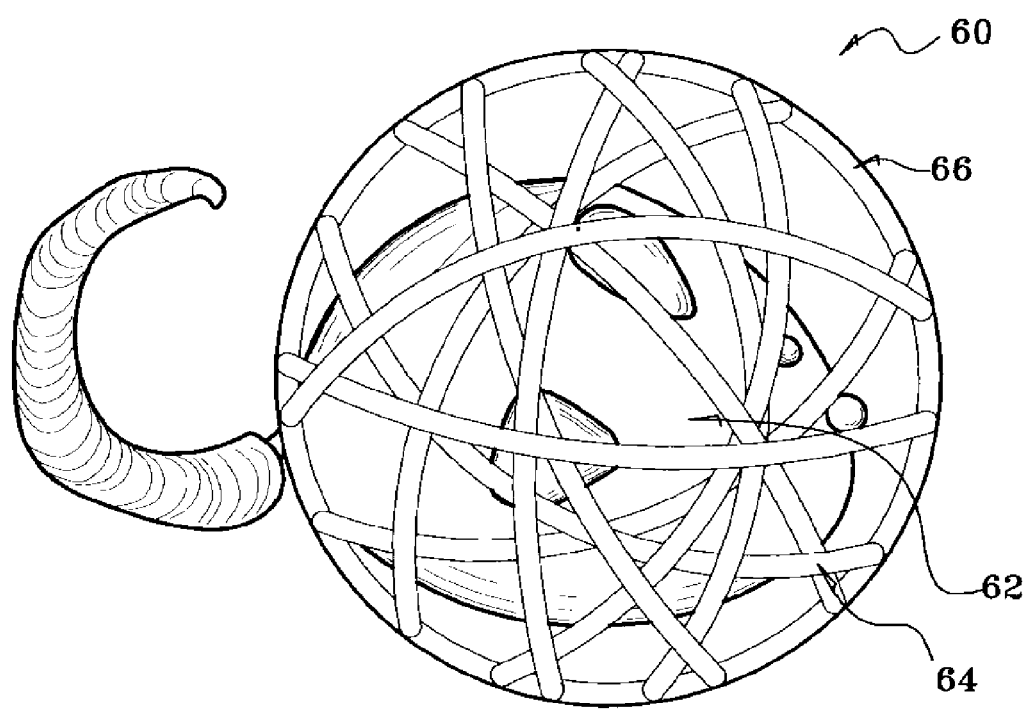
FIG. 6 is photograph of a simulated mouse toy having a multi sensory stimulation device targeted toward a pet's nocturnal instincts and behaviors in accordance with a second preferred embodiment of the present invention.

FIG. 6 depicts a multi sensory stimulation device 60 in which a simulated prey toy 62 is provide, such as a type having a prerecorded sound chip, housed in a skeletal type ball housing 64 in which the balls open frame allows for the target pet to visually perceive the prey toy 62 inside. The housing 64 shown herein consists of an open frame formed of geometrically intersecting ribs 66 molded of a plastic that incorporates a luminescent or chemiluminescent material to allow for absorption of radiant light energy during the day and subsequently discharging at night or when placed in the dark. Such a molded-in illumination can provide the illumination mechanism targeted toward a pet's nocturnal instincts and behaviors.

Figure 7:
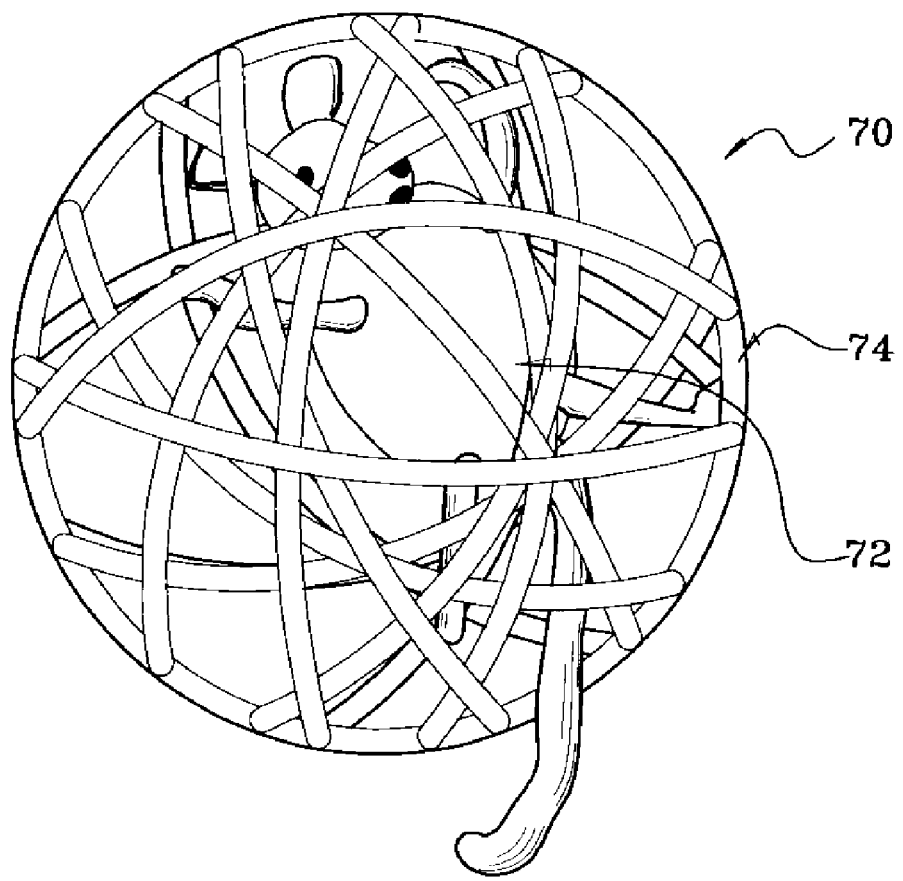
FIG. 7 is photograph of a simulated mouse toy having a multi sensory stimulation device targeted toward a pet's nocturnal instincts and behaviors in accordance with a third preferred embodiment of the present invention.

FIG. 7 depicts an embodiment 70 similar to that shown in FIG. 6, but in which the simulated prey toy 72 is provide, such as a type having a prerecorded sound chip, but affixed to the outer ball housing 74, as opposed to placed freely movable within.

FIG. 8 depicts an additional embodiments 80 in which a simulated prey toy of the type provided in the preferred embodiment 10 in which the outer covering 12 incorporates a luminescent or chemiluminescent material to allow for absorption of radiant light energy during the day and subsequently discharging at night or when placed in the dark. Such a coated or sprayed-on illumination can provide multiple illumination mechanism targeted toward a pet's nocturnal instincts and behaviors.

Similarly, FIG. 9 depicts an additional embodiment 90 in which the simulated which a simulated prey toy does not incorporate the LED illumination mechanism but still incorporates a luminescent or chemiluminescent material to allow for absorption of radiant light energy during the day and subsequently discharging at night or when placed in the dark. Such a coated or sprayed-on illumination can provide multiple illumination mechanism targeted toward a pet's nocturnal instincts and behaviors.

2. Operation of the Preferred Embodiment

In operation, when a user imparts motion or continued to move the simulated prey toy having a multi sensory stimulation device targeted toward a pet's nocturnal instincts and behaviors in accordance with a first preferred embodiment of the present invention, sufficient physical motion activates the prerecorded sound chip and illumination mechanism.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

Having thus described the invention what is claimed as new and desired to be secured by Letters Patent is as follows:

1. A toy comprising:
   a housing;
   a prerecorded sound chip assembly contained within said housing, said sound chip assembly having a sound chip and a source of electrical power, said sound chip assembly is positioned in said housing and said sound chip assembly emits a recorded or prerecorded sound in response to physical urging;
   an illumination device operatively connected in conjunction with the prerecorded sound chip to simultaneously provide an illuminated visual stimulation; and
   a skeletal type ball for containing said housing in which said ball has an open frame for allowing a target pet to visually perceive the housing inside;
   wherein said skeletal type ball comprises an open frame formed of geometrically intersecting ribs molded of a plastic that incorporates a luminescent or chemiluminescent material to allow for absorption of radiant light energy during the day and subsequently discharging at night or when placed in the dark.

2. The toy of claim 1, wherein said housing is secured to said frame.

3. The toy of claim 1, wherein said housing further comprises an outer coating of a luminescent or chemiluminescent material to allow for absorption of radiant light energy during the day and subsequently discharging at night or when placed in the dark.

4. The toy of claim 1, wherein said housing resembles a prey animal of a cat or dog.

5. The toy of claim 1, wherein said sound chip emits a sound resembling that of said prey animal.

6. The toy of claim 1, wherein said housing has a mouse like appearance.

7. The toy of claim 1, wherein said illumination device comprises at least one light emitting diodes (LED's) having a source of electrical power.

8. The toy of claim 1, wherein said illumination device and said prerecorded sound chip assembly share the same source of electrical power.

9. A toy comprising:
    a housing comprising an outer coating of a luminescent or chemiluminescent material to allow for absorption of radiant light energy during the day and subsequently discharging at night or when placed in the dark;
    a recorded or prerecorded sound chip assembly contained within said housing, said sound chip assembly having a sound chip and a source of electrical power, said sound chip assembly is positioned in said housing and said sound chip assembly emits a prerecorded sound in response to physical urging, wherein said prerecorded sound chip emits a sound resembling that of said prey animal; and
    a skeletal type ball for containing said housing in which said ball has an open frame for allowing a target pet to visually perceive the housing inside;
wherein said skeletal type ball comprises an open frame formed of geometrically intersecting ribs molded of a plastic that incorporates a luminescent or chemiluminescent material to allow for absorption of radiant light energy during the day and subsequently discharging at night or when placed in the dark.

10. The toy of claim 9, wherein said housing is secured to said frame.

* * * * *